(12) United States Patent
Grossman et al.

(10) Patent No.: US 8,408,340 B2
(45) Date of Patent: Apr. 2, 2013

(54) SELF-CONTAINED JETTISONABLE TRACKED DRIVE

(76) Inventors: Vitaly Grossman, West Bloomfield, MI (US); Boris Mezir, Southfield, MI (US); Mike Nem, Southfield, MI (US)

( * ) Notice: Subject to any disclaimer, the term of this patent is extended or adjusted under 35 U.S.C. 154(b) by 175 days.

(21) Appl. No.: 12/892,538

(22) Filed: Sep. 28, 2010

(65) Prior Publication Data

US 2012/0073887 A1    Mar. 29, 2012

(51) Int. Cl.
*B62D 55/00* (2006.01)
(52) U.S. Cl. ........................................................ 180/9.1
(58) Field of Classification Search ................... 180/9.1, 180/9.32, 9.42, 9.21
See application file for complete search history.

(56) References Cited

U.S. PATENT DOCUMENTS

| | | | | |
|---|---|---|---|---|
| 3,752,499 A * | 8/1973 | Brandstadter | ............... | 280/6.157 |
| 3,994,352 A * | 11/1976 | Siorek | ............... | 180/9.1 |
| 5,022,812 A * | 6/1991 | Coughlan et al. | ............... | 414/729 |
| 5,097,916 A * | 3/1992 | Brandstadter | ............... | 180/9.1 |
| 6,425,450 B1 * | 7/2002 | Lansberry | ............... | 180/9.36 |
| 7,036,894 B1 * | 5/2006 | Woodall et al. | ............... | 305/185 |
| 2007/0017713 A1 * | 1/2007 | Sewell et al. | ............... | 180/9.1 |

* cited by examiner

*Primary Examiner* — Tashiana Adams
(74) *Attorney, Agent, or Firm* — Kohn & Associates, PLLC

(57) ABSTRACT

A self-contained jettisonable tracked drive, which is intended for redundant propulsion of the multi-track vehicle. This drive enhanced survivability of military vehicle to perform under enemy fire and over anti-tank mines.

8 Claims, 4 Drawing Sheets

SELF-CONTAINED JETTISONABLE TRACKED DRIVE

This patent application incorporated herein by reference, which claims the benefit of U.S. Provisional Application Ser. No. 61/227,846, filed on Sep. 30, 2009.

BACKGROUND OF THE INVENTION

All military fighting armored vehicles are designed to maximize its combat performance and to minimize the combat losses. To achieve it, the following key performance points were defined, which serve as a guide to the military fighting armored vehicles designers. Here some of these key points, related to the present invention are listed:
1. Propulsion redundancy
2. Survivability including reduction of target signature
3. Armor protection
4. Fire power
5. Mobility
6. Combat readiness
7. Convenience for the crew
8. Mobility range Every military fighting armored vehicle regardless of age, purpose and origin is always a compromise between the key performance points above.

In last 100 years only 3 types of military fighting armored vehicles were developed:
1. Tracked.
2. Wheeled.
3. Half-tracked.

The novelty of the present invention is that self-contained jettisonable tracked drive can be remotely jettisoned, in case of any of its parts get damaged, which is first real breakthrough in military armored vehicle development in more than 65 years.

SUMMARY OF THE INVENTION

The object of the present invention is a self-contained jettisonable tracked drive, which enhanced survivability of the multi-track vehicle.

The present invention is made of jettison means 2, which has one side attached to the vehicle by mechanical attachment means 11, wherein the opposite side of said jettison means 2 is permanently attached to propulsion apparatus 1. Said propulsion apparatus 1 incorporates said elevation mechanism 3, which has said endless track 10 circumventing components, positioned on the moving up and down surface of said elevation mechanism 3, including said motor with output sprocket 4, two said road wheels 8 suspended by said suspension means 5, and one said idler 9. Said electrical connection means 6, and said pressurized liquid connection means 7 are positioned on said jettison means 2.

To use present invention requires attaching a self-contained jettisonable tracked drive to the side of vehicle with its said jettison means 2 by mechanical attachment means 11. Use of self-contained tracked drives for military vehicle offers the following enhancements over prior art, including:

Propulsion redundancy is provided by mechanical and power consumption independence of self-contained jettisonable tracked drive, which requires only three interfacing connections to the military vehicle. Thus military vehicle is the source of power, while the present invention—A self-contained jettisonable tracked drive is a load. The damage or malfunction of one of the loads will not catastrophically affect the source of power. Any damaged drive can be either remotely jettisoned in seconds, or replaced in minutes.

Survivability is enhanced by incorporation of the suspension means 5 to propulsion apparatus 1, which is claimed by this invention. For said suspension means 5, being part of self-contained jettisonable tracked drive instead of part of the vehicle, allows vehicle to use sharp V-shaped bottom having smooth and solid surface, and not protruded by torsion bar suspension. This feature is critically important to deflect underbelly mine explosion. Also the present invention allows reduction of the vehicle target signature in the ambush mode, and reduction of required volume for a vehicle during transportation by incorporation of elevation mechanism 3 to propulsion apparatus 1 for variable ground clearance.

Armor protection: According to the present invention, each jettisonable tracked drive is self-contained and has its own motor. This propulsion motor is not protected by main armor, and need not be, because in all prior arts the sprocket, suspension system, tracks, road wheels, and idlers are located outside of the armored hull anyway. Reduction of the wasteful armor protection volume reduces the weight. Local armored housing for the motor would be reasonable protection, equalized to the level of protection of the neighboring components. In this case, by increasing an armor protection around smaller volume, much better protection for the crew is provided at lesser gross weight.

Fire power: As mentioned above, reduction of the wasteful armor protection volume reduces the weight. Adding more ammunition or updating caliber of main gun shall enhance fire power.

Mobility: According to the present invention, each self-contained jettisonable tracked drive can operate off-road at different speed, and different ground clearance, depending on traction, which overall improves off-road mobility.

Combat readiness: Under most of circumstances, the damage inflicted by enemy fire or land mine to one of the self-contained jettisonable tracked drives does not require to abort the mission or do an immediate repair or replacement. The damaged self-contained jettisonable tracked drive can be remotely jettisoned, according to the present invention. The present invention can be manufactured on the conveyor production line, dramatically reducing overall cost of the vehicle, thus rendering this invention as an expendable military item.

Convenience for the crew: According to the present invention, making the motor as a part of the self-contained jettisonable tracked drive, allowed re-arraignment of the interior of the hull, providing more useful and safer space for the crew.

Mobility range: According to the present invention, each self-contained jettisonable tracked drive includes a dedicated motor. If drive or vehicle is equipped with additional energy storage, then each drive can capture the energy during breaking, which saves the fuel, and adds many miles to mobility range.

Overall, in addition to three existing types of the military armored vehicle propulsion systems: tracked, wheeled, semi-tracked this invention constitutes new 4th type-vehicle, equipped with multiple self-contained jettisonable tracked drives. There are also other applications besides military, which will surface as the technology becomes widely known.

DETAILED DESCRIPTION OF INVENTION

Figure 1:
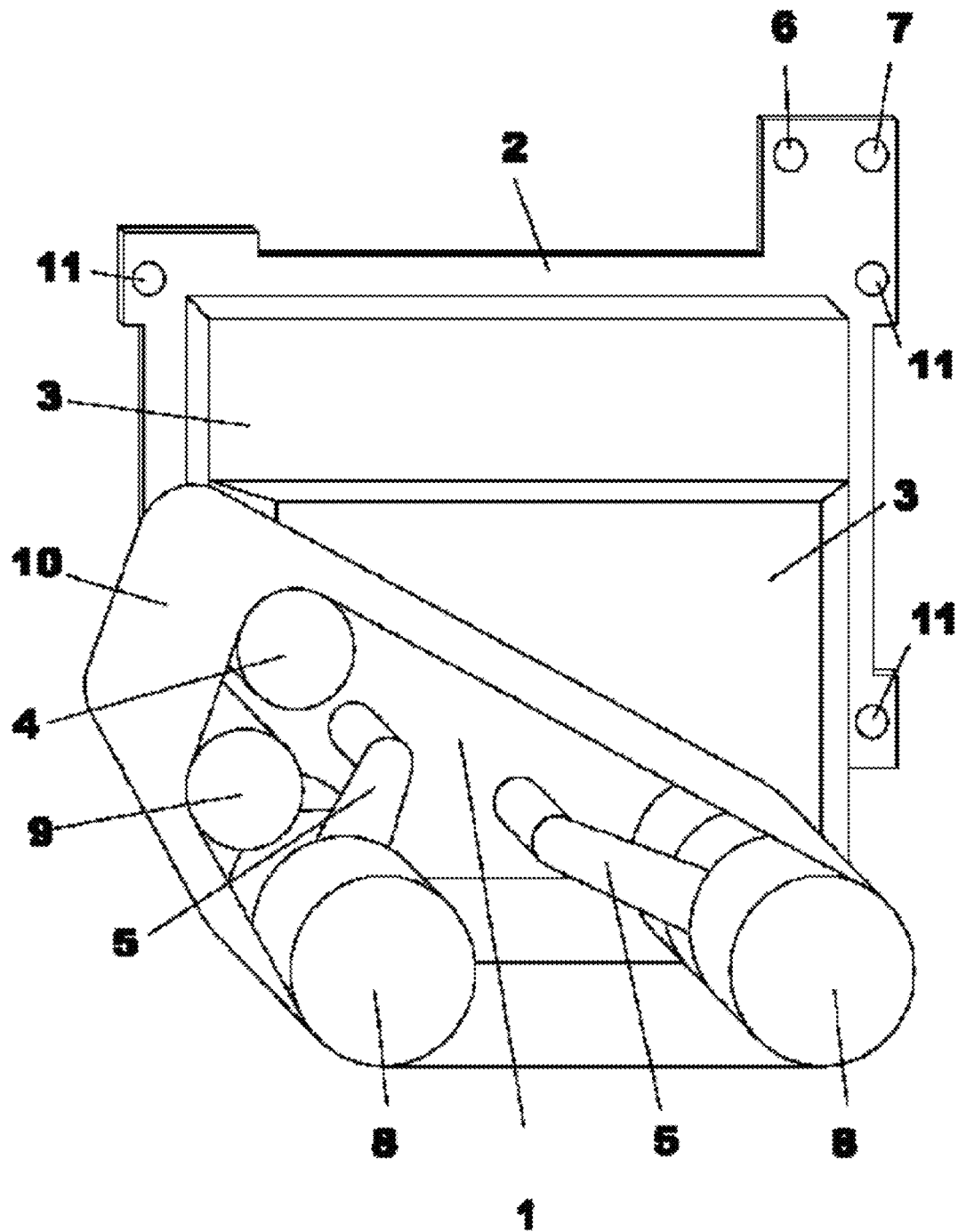
FIG. 1 presents a perspective view of self-contained jettisonable tracked drive in upper position.

FIG. 1 Perspective view of self-contained jettisonable tracked drive in upper position is presented, wherein said propulsion apparatus 1, and jettison means 2 are shown with elevation mechanism 3 of said propulsion apparatus 1, in its upper position. The following is attached to said propulsion apparatus 1: elevation mechanism 3, said motor with output sprocket 4, said suspension means 5, two said road wheels 8, one said idler 9, said endless track 10. Said mechanical attachment means 11, said electrical connection means 6, and said pressurized liquid connection means 7 are attached to said jettison means 2.

Figure 2:
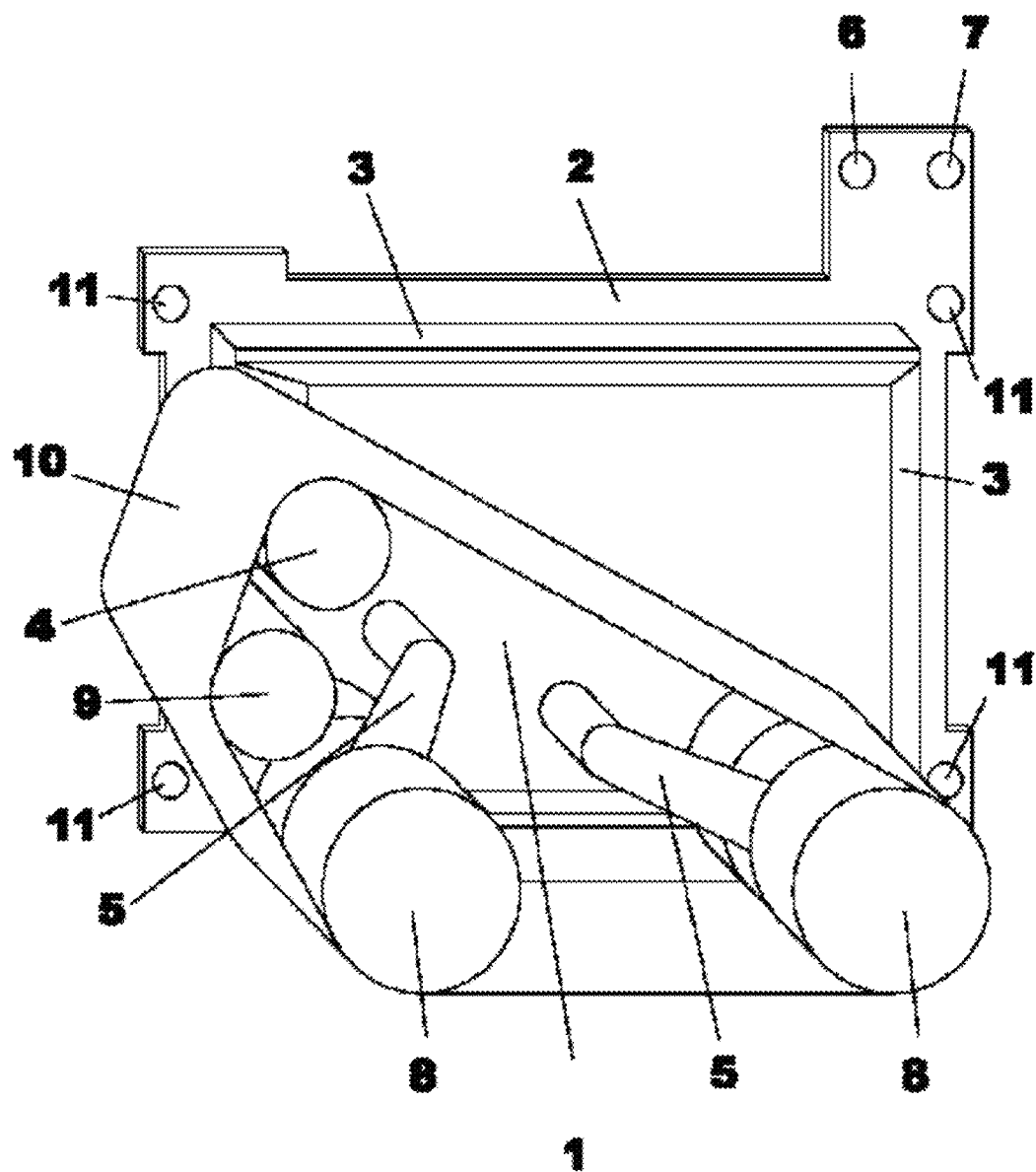
FIG. 2 presents a perspective view of self-contained jettisonable tracked drive in lower position.

FIG. 2 Perspective view of self-contained jettisonable tracked drive in upper position is presented, wherein said propulsion apparatus 1, and jettison means 2 are shown with elevation mechanism 3 of said propulsion apparatus 1, in its lower position. The following is attached to said propulsion apparatus 1: elevation mechanism 3, said motor with output sprocket 4, said suspension means 5, two said road wheels 8, one said idler 9, said endless track 10. Said mechanical attachment means 11, said electrical connection means 6, and said pressurized liquid connection means 7 are attached to said jettison means 2.

Figure 3:
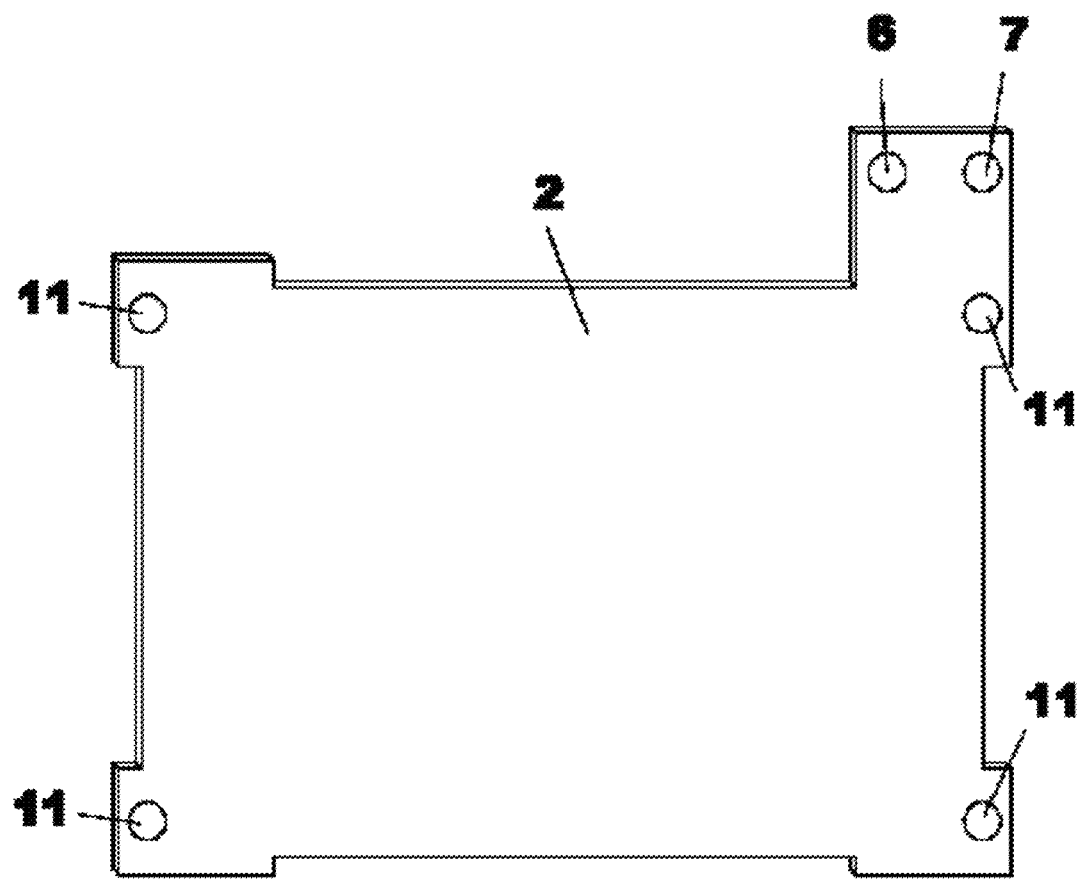
FIG. 3 presents a perspective view of the jettison means 2 of self-contained jettisonable tracked drive.

FIG. 3 Perspective view of the jettison means 2 of self-contained jettisonable tracked drive is presented. Said mechanical attachment means 11, said electrical connection means 6, and said pressurized liquid connection means 7 are attached to said jettison means 2.

Figure 4:
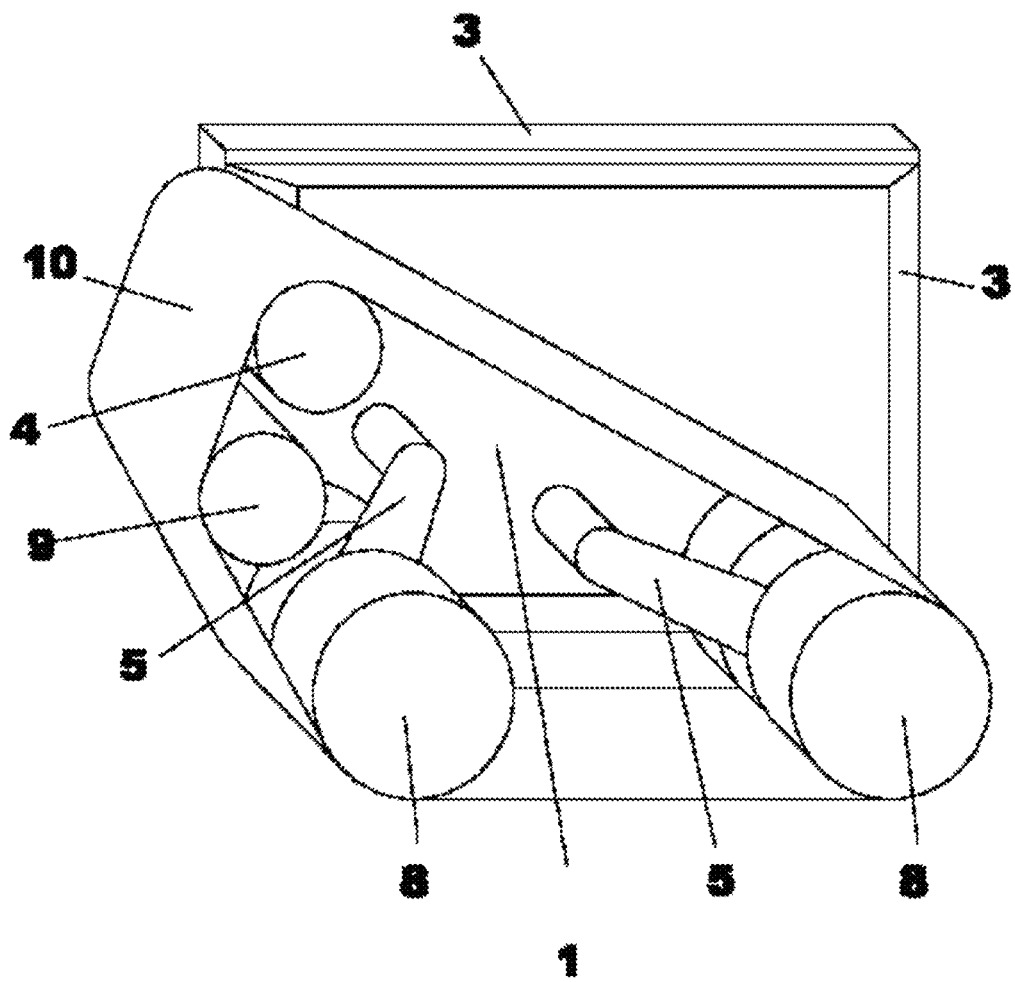
FIG. 4 presents a perspective view of the propulsion apparatus 1 of self-contained jettisonable tracked drive in lower position.

FIG. 4 Perspective view of the propulsion apparatus 1 of self-contained jettisonable tracked drive is presented. The following is attached to said propulsion apparatus 1: elevation mechanism 3, said motor with output sprocket 4, two said road wheels 8 on said suspension means 5, one said idler 9, and said endless track 10

BEST MODE OF THE INVENTION

In the best mode of invention said self-contained jetisonable tracked drive shall include two said road wheels 8, wherein each said road wheel is suspended by dedicated said suspension means 5, which can be torsion spring or compression spring type, providing travel for off-road performance. The motion of said suspension means 5 shall be positioned in such way, that at any relative position between dedicated said suspension means 5, shall not cause said endless track 10 to be overstretched or produce excessive slack, compromising firm operation of said endless track 10, relatively to said motor with output sprocket 4 and said road wheels 5. In other words at any combination of ground surface and positions of dedicated said suspension means 5, said endless track shall not fail to convert rotation of motor with output sprocket 4 to linear motion of said endless track 10. It shall be noted, that in the best mode of the invention said jettison means 2 shall either sequentially or simultaneously sever attachment of said mechanical attachment means 11, said electrical connection means 6, and said pressurized liquid connection means 7 to the surface and mating connections to which said self-contained jetisonable tracked drive is attached. After jettison action occurred, said self-contained jettisonable tracked drive shall be considered as a disposed item.

While the invention has been described in connection with preferred embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

The invention claimed is:

1. A self-contained jetisonable tracked drive comprising: a propulsion apparatus including at least one mechanical attachment to a vehicle, at least one electrical connection to an electrical system of the vehicle, at least one pressurized fluid connection to a pressurized fluid system of the vehicle, said propulsion apparatus jettisonable from said vehicle upon severance of said at least one mechanical attachment, said at least one electrical connection, and said at least one pressurized fluid connection; and jettison means for severing said at least one mechanical attachment, said at least one electrical connection, and said at least one pressurized fluid connection.

2. A drive as defined in claim 1, wherein said propulsion apparatus further includes an elevation mechanism.

3. A drive as defined in claim 1, wherein said propulsion apparatus further includes motor with output sprocket.

4. A drive as defined in claim 1, wherein said propulsion apparatus further includes suspension means.

5. A drive as defined in claim 1, wherein said propulsion apparatus includes at least two road wheels.

6. A drive as defined in claim 1, wherein said propulsion apparatus further includes at least one idler.

7. A drive as defined in claim 1, wherein said propulsion apparatus further includes endless track.

8. A drive as defined in claim 1, wherein said jettison means is further defined as remotely actuatable jettison means.

* * * * *